US007245932B2

(12) United States Patent
Florkey et al.

(10) Patent No.: US 7,245,932 B2
(45) Date of Patent: Jul. 17, 2007

(54) REAL TIME ADMINISTRATION OF SHARED COMMUNICATION PLAN ARRANGEMENTS

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Ronald Bruce Martin, Carol Stream, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 420 days.

(21) Appl. No.: 10/441,751

(22) Filed: May 20, 2003

(65) Prior Publication Data

US 2004/0235457 A1 Nov. 25, 2004

(51) Int. Cl.
*H04B 7/00* (2006.01)
(52) U.S. Cl. .................. 455/518; 455/519; 455/420
(58) Field of Classification Search ........ 455/518–519, 455/418–420, 410–411
See application file for complete search history.

(56) References Cited

U.S. PATENT DOCUMENTS 6,085,084 A * 7/2000 Christmas .................. 455/411
6,115,613 A * 9/2000 Jonsson ..................... 455/519
6,311,055 B1 10/2001 Boltz
6,477,150 B1 11/2002 Maggenti
6,647,384 B2 * 11/2003 Gilmour ........................ 707/5
2002/0131407 A1 * 9/2002 Muhonen .................... 370/352
2002/0177433 A1 * 11/2002 Bravo et al. ................. 455/411
2003/0073427 A1 4/2003 Lima et al.

\* cited by examiner

*Primary Examiner*—Jean Gelin
*Assistant Examiner*—Fred A. Casca

(57) ABSTRACT

A method and apparatus for providing real time updates of a database describing the features of individual terminals of a shared plan telecommunications group for communication sessions from and to that individual terminal. The characteristics (numbering plan, incoming and outgoing screening, alternate routing, types of service provided) of each of the individual stations of the shared communication plan are stored in a database accessed through a server. The database can be updated in real time by a designated one of the stations in the shared group. The designated station can also handle appeals for an exception to the restrictions stored in the database. The designated station can receive immediate or periodic information on activity of individual stations, or can receive such information on request. Advantageously, updates of the database can be implemented immediately and economically without requiring assistance of the personnel of the carrier, and the designated station can control communications for the group.

20 Claims, 5 Drawing Sheets

REAL TIME ADMINISTRATION OF SHARED COMMUNICATION PLAN ARRANGEMENTS

TECHNICAL FIELD

This invention relates to the control of features for groups of telecommunications terminals, and, more specifically, to real time control of such features.

BACKGROUND OF THE INVENTION

In the prior art there are many arrangements wherein a telecommunications network controls groups of telecommunications terminals in order to provide the members of the group with the kinds of features that are otherwise provided from private branch exchanges and/or key telephone systems. For example, commonly available Centrex® systems allows the individual callers of the group to reach each other by dialing a much smaller number of digits (typically 3–6 digits) while still allowing the members of the group to reach the outside world by dialing an access code (typically "9") followed by a regular (POTS—plain old telephone service) telephone number. Virtual Centrex service can also be provided by having an intelligent network with a service control point (SCP) having a database to supply the data necessary for providing the individual telephone stations with services including those of a Centrex system. Intelligent network systems frequently provide outgoing or incoming call screening, i.e., selective blocking of calls based on the calling or called number. Such systems can also be used for serving mobile stations.

A problem of the prior art is that in order to make any kind of change such as removing a call restriction from a particular station it is necessary to go through an administrative procedure in the common carrier serving the members of the group. Changes therefore can typically be made only in a matter of days. This is undesirable, for example, to modify a restriction on the number of minutes of use allowed to a particular group member.

SUMMARY OF THE INVENTION

Applicants have studied these systems carefully and have concluded that they lack the flexibility for providing immediate changes in customer station restrictions, and that they lack a fast mechanism for providing exceptions. These problems are overcome and an advance is made over the prior art in accordance with Applicants' invention, wherein a member of the group is given access to a database used for establishing communication sessions in accordance with the features of the individual members of the group; this database is then consulted whenever a call or other communication session is originated by or terminated to one of the members of the group. The restrictions can be applied to telephone or mobile calls, short messages, Internet web site access, immediate message transmittal and other telecommunications services. Advantageously, changes can be made in real time. Advantageously, the system provides cost savings to the carrier which need not provide personnel to process changes.

In accordance with one preferred embodiment of Applicants' invention the network is the public mobile communications network and the group of terminals is a group of wireless stations. The home location register (HLR) and visitor location register (VLR) combination provides data for identifying telecommunications stations which subscribe to a group plan service. When incoming calls to or outgoing calls from such stations are received, the HLR/VLR combination provides information to the call processing system to request that an application server be queried and the data from a database associated with that application server be used for establishing calls from or to that station. The call processing system has access to a database for identifying the application server that serves the group of the originating or terminating station.

In accordance with one preferred embodiment of Applicants' invention one member of the group is assigned the role of primary member. This member, identified by data in the database of the group, has the authorization for changing the entries in the database for all members of the group. Alternatively, a primary member can be identified by a personal identification number (PIN) when requesting a change in the database for the group.

In accordance with one feature of Applicants' invention, if on terminating calls a particular station can be blocked from receiving terminating calls from-particular callers, or from all but particular callers, the calls can be rerouted to a different station.

In accordance with another service offered by Applicants' invention, a call from one of a group of callers can be presented to a terminating station, which can accept the call or have the call automatically rerouted to a designated terminal; the rerouting can be performed in response to an indication (such as a "flash" signal, the operation of a dual tone multifrequency (DTMF) key or the operation of a "soft button" to control appropriate software) from the terminating station.

In accordance with one feature of Applicants' invention, a party that is blocked from originating or receiving a call or a service, can appeal immediately to the primary member who can remove the restriction for this call by operating an indicator from a terminal. Advantageously, this arrangement allows for an emergency use of a restricted facility. For example, while instant messaging may normally be denied to a station, the ability to send just one instant message may be useful.

The restrictions can be based on one or more of the following: communication source and/or destination; time of day and/or day of week/month/year, amount of use (minutes); type of application (e.g., games).

The primary station can receive reports concerning communication sessions (calls, Internet web access, Immediate Messaging sessions, conference calls, short messages), periodically, upon demand, or in response to the attempt to establish a particular communication session. The report can be for sessions of one or all members of the group.

One application for this type of service is to allow parents to monitor and control the use of cellular terminals by their children. This can include limitations on time, limitations on callers and called parties, limitations on applications (e.g., games).

BRIEF DESCRIPTION OF THE DRAWING(S)

DETAILED DESCRIPTION

Figure 1:
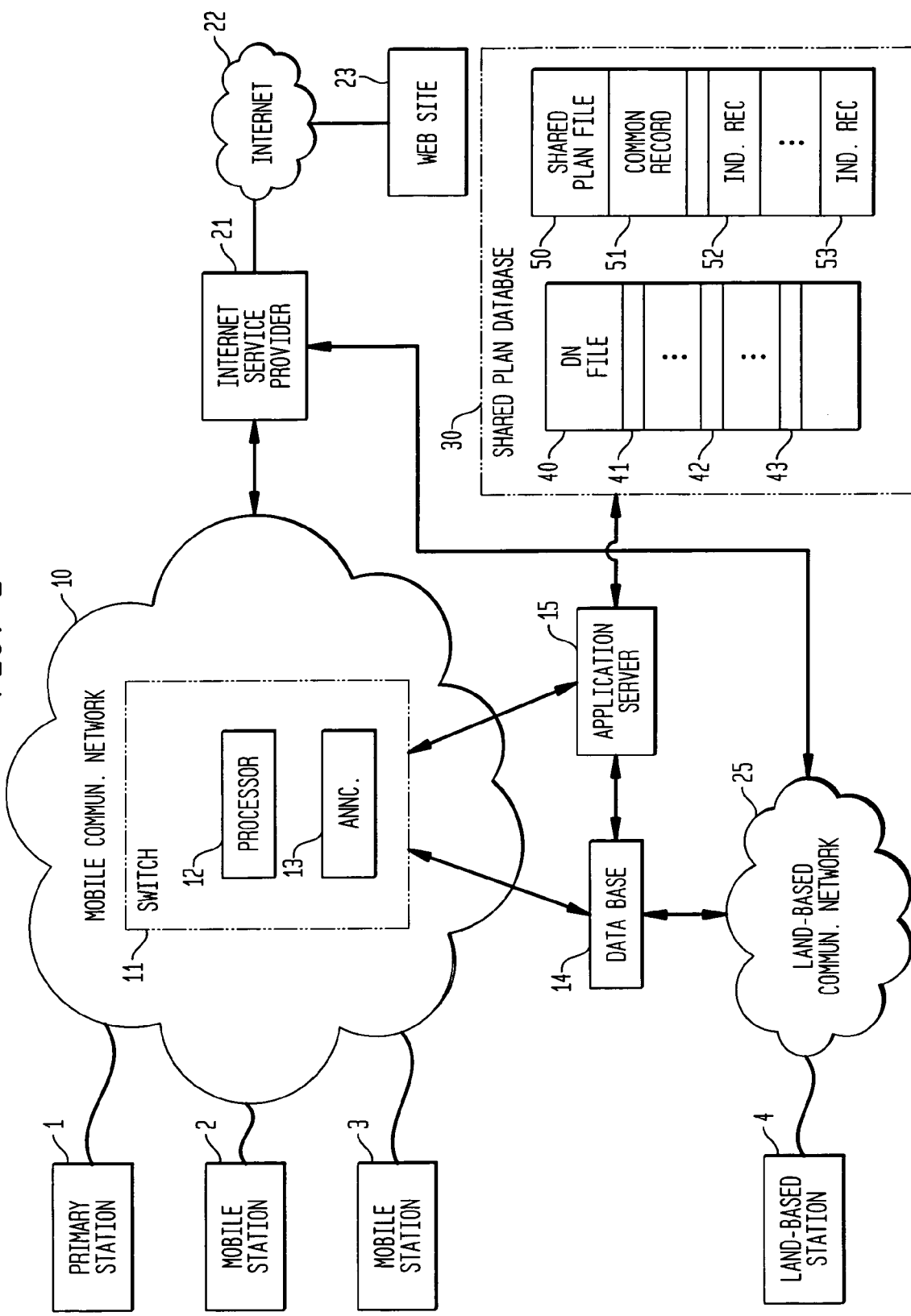
FIG. 1 is a block diagram illustrating the overall operation of Applicants' invention.

FIG. 1 is a block diagram illustrating the operation of Applicants' invention. A shared plan group of mobile stations 1, 2, . . . ,3 are all connected via base stations (not shown) to a mobile communications network (MCN) 10. MCN 10 supports voice, circuit data, and packet data.

The mobile stations can be equipped with computer terminals to allow for displays and for transmitting messages generated under the control of "soft buttons" of the computer display. The terminals can be equipped to communicate with the Internet, and can receive and transmit Short Message Service messages, and Immediate Messaging messages. The terminals can be identified by a mobile telephone number or by a URL (Universal Resource Locator). This represents usage of IP services in which the calling/called station is some type of terminal that is accessed via the Internet or other data network. Applications for which URLs would be used include VoIP, voice over IP services, e-mail services, soft phones, IM, etc. While the specific embodiment is for calls between a mobile terminal that is a member of a group and another terminal, it is to be understood that the same types of arrangements can be used for other communication sessions. For example, this service can allow application restriction as well—such as games. It is not simply intended for voice. Other communications for data services include SMS, IM, web access, e-mail.

A switch 11 of MCN 10 contains a processor 12 for controlling call processing for these stations and an announcement system 13 for returning announcements to ones of these stations. The primary station 1 is distinguished from the others in that only the primary station has the ability to change data in the database for the shared plan in real time. When an outgoing call request is received in MCN 10, or an incoming call is received in MCN 10, the network consults a database, such as a home location register and/or visitor location register 14 to determine whether the caller of the originating call or the called party of the incoming call is a member of a shared plan. If not, the call is established in accordance with the principles of the prior art. If the originating call is from a station in a shared plan or the incoming call is to a station that is in a shared plan, then the application server 20 is accessed in order to obtain data from the shared plan database 30. The switch 11 then uses the data from the shared plan database to determine how the call is to be processed.

Each switch of MCN 10 has access to a database 14 (such as HLR/VLR) for identifying directory numbers that are part of a shared plan, and for identifying the server serving that shared plan. Database 30 is the database for a plurality of shared plans. In one embodiment, this database has a file 40 for all destinations (numbers or other identifiers such as URL or handles (e.g., janedoe@nowhere.com where janedoe is the handle, or Instant Messaging contacts that are part of a shared plan. Each entry points to a shared plan data file, such as block 50, for the shared plan of which that destination is a member. Block 50 is a block for a particular shared plan file. It contains a common record 51 of information about the shared plan group. This data would include the identity of the primary station and/or a personal identification number (PIN) for designating or identifying the primary station, and pointers to the individual records for individual stations. If two or more stations share the same individual record, i.e., the same features and screening, then the pointers of the two or more stations can point to the same record. The individual records 52, . . . ,53 contain information as to which destinations the particular stations can reach and cannot reach; and calls from which sources (telephone numbers or other identifiers) can be completed or blocked to the specific station. In addition, for some stations of the group and for some callers for these stations, an alternate destination is listed to which calls for the initial destination can be completed.

Data services such as SMS, IM, or e-mail, soft phone sessions, etc. would work in a similar manner. A text, or data, message is sent from one terminal to another, and will be intercepted by any restrictions placed on the user. For example, if the sending user is only allowed N number of SMS messages per day, the primary could provision this in the HLR, and block any messages that exceed this number. If data messages are not allowed from a particular user (e.g., based on that user's identification or handle), then they would be blocked in real time, and a notification would be sent to the primary (if this notification function is provisioned) to warn them of the occurrence.

Also shown on FIG. 1 are connections to an Internet Service Provider (ISP) 21, connected to the Internet 22. The Internet is connected to a web site 23 which may provide Internet server functions and/or data. The mobile communication network 10 is also connected to a land-based communication network 25 for interconnecting nodes of network 10 and for connection to land-based terminals. One of these land-based terminals is terminal 4, part of the group controlled by primary station 1.

A communication session as used herein includes voice communication (point-to-point, conference, broadcast); short message service; connections to an Internet server; immediate messaging; video streaming; telecommunications game playing; and file transfers.

Figure 2:
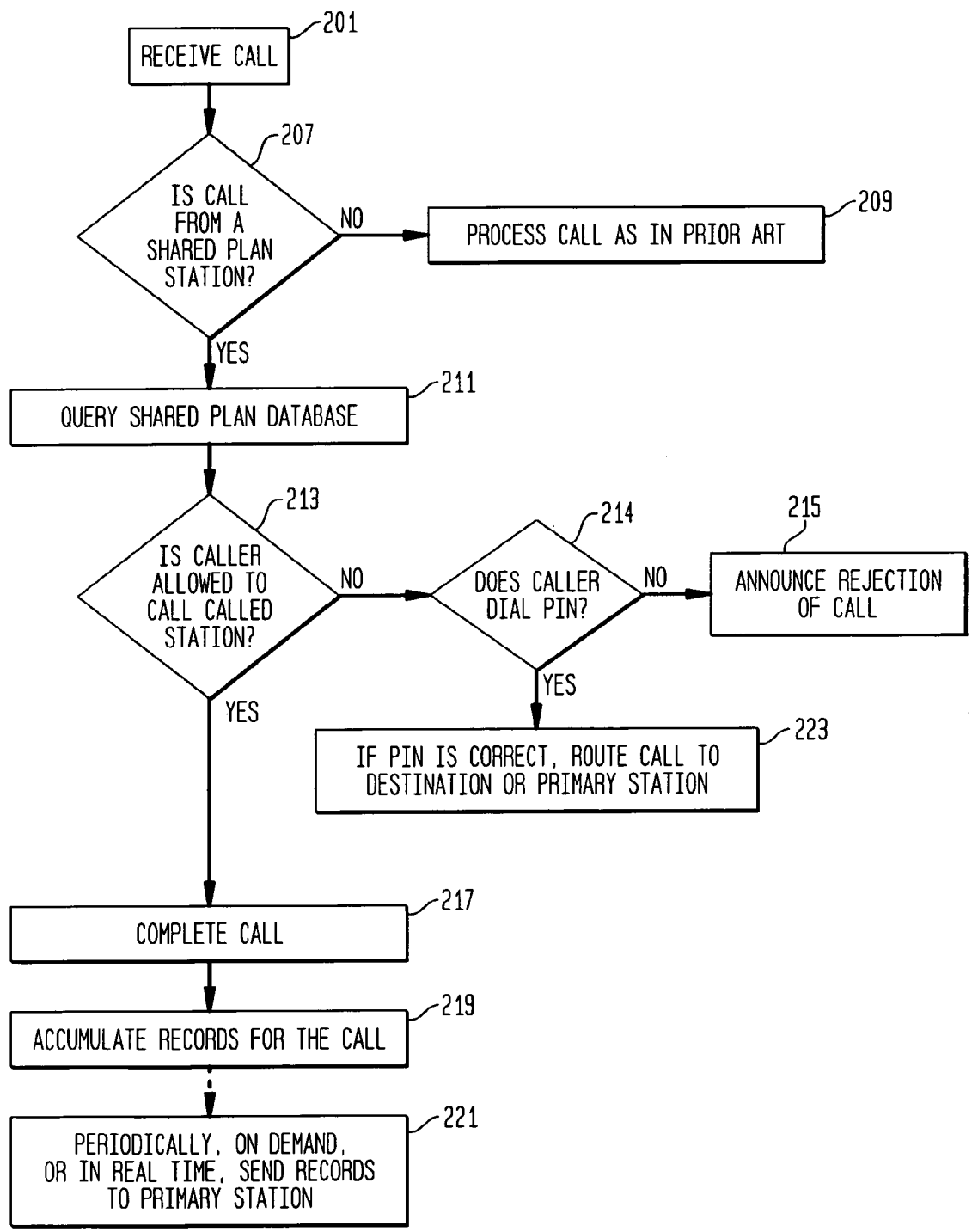
FIG. 2 is a flow diagram for an outgoing call from the group.

FIG. 2 is a flow diagram illustrating the processing of an outgoing call. A call is received in the MCN (action block 201). A test (207) is made whether this call is from a shared plan station. If this call is not from a shared plan station (negative result of test 207) then the call is processed as in the prior art (action block 209). If the call is from a shared plan station then the shared plan database is accessed (action block 211). This access is via the application server 20. The accessing message includes the called number. Test 213 is used to determine whether the caller is allowed to call the called number. If not, then the rejection of the call is announced (action block 215). If the caller is allowed to call the called number then the call is completed (action block 217). Records for the call (time of call, length of call, calling and called numbers) are accumulated (action block 219). These records are then sent to the primary station on demand, periodically, or in real time (i.e., immediately) (action block 221). In accordance with one feature of the invention, if the caller of a tentatively rejected call then dials an appropriate PIN (action block 214), the call can be completed or, alternatively, routed to the primary member of the group (action block 223).

Figure 3:
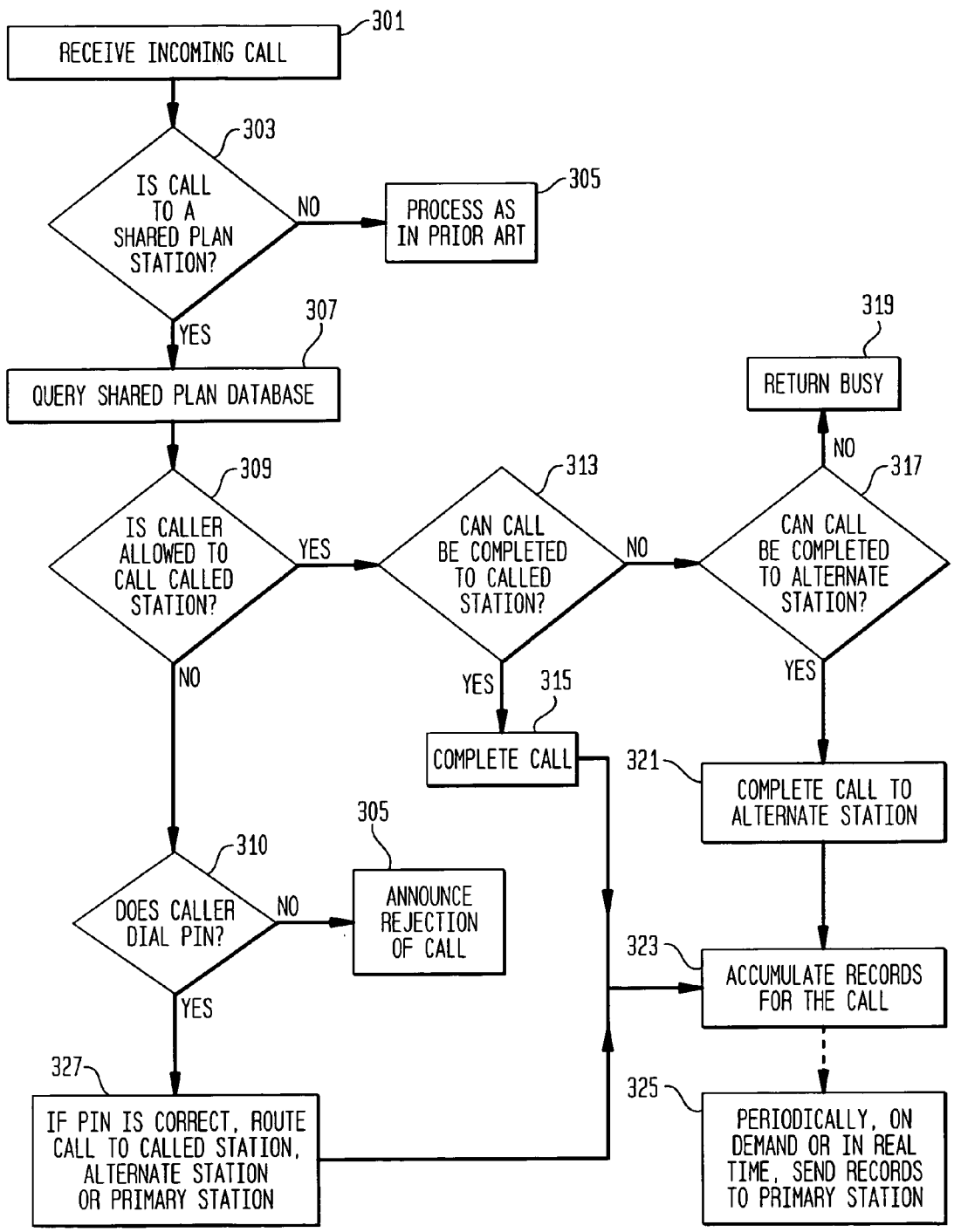
FIG. 3 is a flow diagram of an incoming call for a member of the group.

FIG. 3 is a flow diagram of an incoming call. The call is received (action block 301). Test 303 is used to determine whether the call is to a shared plan station. If not, then the call is processed as in the prior art (action block 305). If the call is to a shared plan station then the shared plan database is queried (action block 307). Test 309 is used to determine whether the caller (identified by incoming caller identification) is allowed to call the called number. If the result of test 309 is that this call is not allowed, then a check is made whether the caller dials a PIN (action block 310). If not, then an announcement of the rejection of the call is presented to the caller (action block 311). If the caller is allowed to call the called number then test 313 is used to determine whether the call can be completed to the called number station. This can either be on the basis of the availability (i.e., idle state) of the called station or, on the basis of a feature supplied to the called station, the call is completed to a different station. If the result of test 313 is positive then the call is completed to the called station. If it is negative then test 317 is used to determine whether the call can be completed to an alternate station. If not, then a busy signal or an announcement is returned (action block 319). If the call can be completed to an alternate station then the call is completed to that alternate station (action block 321). In accordance with one feature of Applicants' invention, the call can be initially presented to the called station and the caller identified by caller identification. Then, if the party served by the called station wishes to have the call forwarded to the alternate station, the called party can send an indication to route the call to the alternate station. Records for the call (time of call, length of call, calling and called numbers) are accumulated (action block 323). These records are then sent to the primary station on demand, periodically, or in real time (action block 325). If the caller has dialed a correct PIN, then the call is routed to the called station, alternate station or primary station (action block 327).

Figure 4:
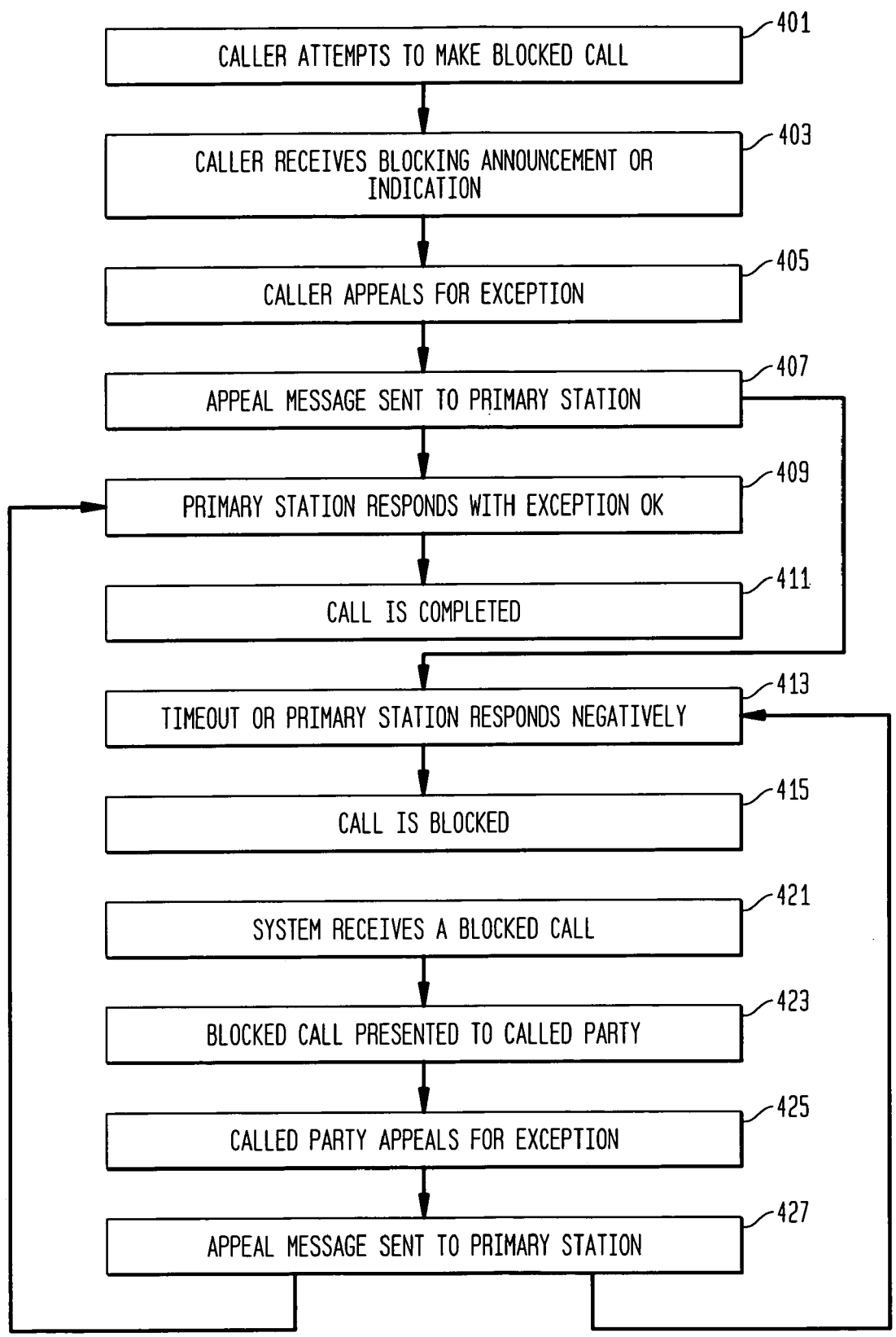
FIG. 4 is a flow diagram illustrating the emergency over-ride for blocked calls.

FIG. 4 illustrates the feature whereby a caller or called party who is restricted from making or receiving a particular type of call, can make a call to or receiving a call from a particular station. The caller attempts to make a restricted (blocked) call (action block 401). The caller receives a blocking announcement (action block 403). The caller appeals for an exception. The appeal is in the form of an indication sent to the network that the exception is being requested. The appeal may be an operation of a dual tone multifrequency (DTMF) button or the operation of a soft button from a terminal. In response, the network sends an appeal message to the primary station (action block 407). If the primary station is a terminal, the appeal message may be displayed (or announced) on the primary station. If the primary station responds with an exception OK indication (action block 409) then the call is completed (action block 411). If there is either a timeout or the primary station responds negatively (action block 413) then the call is blocked (action block 415). This type of arrangement can also be used for incoming calls. The system receives an incoming call which is blocked according to the database of the group (action block 421). The blocked call is presented to the called party (action block 423). This presentation can be on a caller identification display or via an announcement. The call may be presented automatically or in response to an appropriate PIN. The called party may appeal for an exception (action block 425). The appeal indication is the same kind of appeal indication discussed with respect to action block 405. The appeal message is sent to the primary station (action block 427). If the primary station responds with an exception OK (action block 409) then the call is completed (action block 411). If the primary station does not respond within a timeout interval or the primary station responds negatively (action block 413) then the call is blocked (action block 415).

Figure 5:
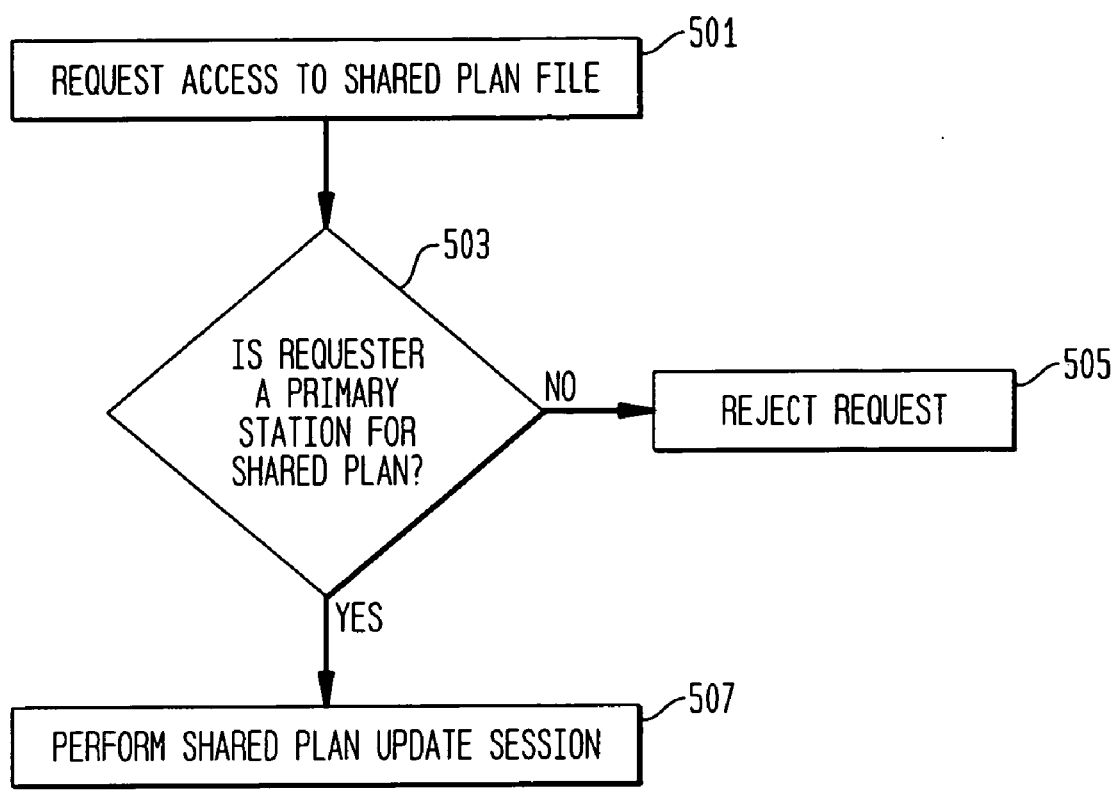
FIG. 5 is a flow diagram illustrating the process of changing the data for the shared plan file.

FIG. 5 is a flow diagram illustrating the process of changing the shared plan file. A party requests access to the shared plan file (action block 501). Test 503 is used to determine if the requester is a primary station for the shared plan. If not, then the request is rejected (action block 505). If the requester is a primary station for the shared plan then a shared plan update session is performed between the primary station and the application server used for controlling the shared plan file of the database. The methods of communicating with the application server are the same as methods for communicating with other servers known in the prior art, i.e., via soft buttons on the primary station terminal, via exchange of prompts and responses, etc.

While in this preferred embodiment the primary station is identified in information stored in the network, an alternative arrangement allows the primary station to be any member of the group identified by means of a personal identification number (PIN). Anyone who has the knowledge of the PIN can then edit the database from a station of the group. With this arrangement, a plurality of stations can act as the primary station, although appeals are still routed to the station recorded as the primary station.

The above description is for a shared plan mobile group. The same basic arrangement can be used for a land based group except that no HLR/VLR is required in a land based group; the data is stored as part of the database of the switch.

The above is one preferred embodiment of Applicants' invention. Other embodiments will be apparent to those of ordinary skill in the art without departing from the scope of the invention. The invention is only limited by the attached claims.

We claim:

1. In a telecommunications network, a method of establishing a communication session comprising the steps of:
   grouping a plurality of telecommunications stations into a shared plan group; initializing a first database comprising data for determining for each member of said shared plan group which communication terminals can be called by the member and from which communication terminals the member can be called;
   responsive to receipt of a request for a communication session, determining whether the requesting or the requested terminal is part of a shared plan group; if said requesting or requested terminal is part of a shared plan group, determining whether the requesting terminal is authorized to establish a communication session with the requested terminal and whether the requested terminal is authorized to establish a communication session with the requesting terminal;
   if the communication session is authorized, completing the call; wherein only an authorized member of the shared communication plan group authorized to change data in the shared plan database can change said data in the shared plan database; and
   responsive to receipt of a request from a station authorized to change the shared plan data file, editing said shared plan data file;
   wherein the shared plan data file can be updated in real time based on input from said authorized member of the shared plan group;
   wherein said authorized member is identified in said first database as the member authorized to change data in the shared database.

2. The method of claim 1 wherein said telecommunications network comprises:
   a mobile network; and
   wherein at least one member of said shared plan group is a mobile station.

3. The method of claim 2 wherein said communication session comprises a telecommunications call from or to said at least one member.

4. The method of claim 1 wherein the determining step comprises the step of accessing an application server for accessing data to make the determination.

5. The method of claim 1 wherein the determining step comprises the steps of:

presenting an indication of said requested communication session to said requested terminal; and giving a party at said requested terminal an option of establishing said communication session or establishing a communication session to a predetermined alternate destination.

6. The method of claim 1 further comprising the steps of:

if the communication session is not authorized, permitting the requesting or requested terminal to send an immediate appeal indication to said member of the shared communication plan group authorized to change data to request an exception from a restriction on the communication session; and responsive to receipt of an authorization from said member authorized to change data, for establishing said communication session, allowing said call to be completed.

7. The method of claim 6 wherein permission to request an exception is one of the restrictions stored for a member of the shared plan group.

8. The method of claim 1 further comprising the step of:

collecting data for communication sessions to and from said shared plan group; and reporting said data to the member of the shared plan communication group authorized to change data.

9. The method of claim 8 wherein said member of the shared communication plan group authorized to change data can request said traffic data.

10. The method of claim 8 wherein data for a communication session is immediately transmitted to said member of the shared communication plan authorized to change data.

11. The method of claim 1 wherein said member of the shared communication plan group authorized to change data is identified by a personal identification number.

12. The method of claim 1 wherein a member of said plan group authorized to change data is also authorized to designate another member as authorized to change data.

13. The method of claim 1 wherein said communication session is from a member of said group to an Internet web site.

14. In a telecommunications network, apparatus for establishing a communication session, comprising:

means for grouping a plurality of telecommunications stations into a shared plan group;

means for initializing a first database comprising data for determining for each member of said shared plan group which communication terminals can be called by the member and from which communication terminals the member can be called;

means, responsive to receipt of a request for a communication session, for determining whether the requesting or the requested terminal is part of a shared plan group;

if said requesting or requested terminal is part of a shared plan group, means for determining whether the requesting terminal is authorized to establish a communication session with the requested terminal and whether the requested terminal is authorized to establish a communication session with the requesting terminal;

if the communication session is authorized, means for completing the call; wherein only an authorized member of the shared communication plan group authorized to change data in the shared plan database can change said data in the shared plan database; and means, responsive to receipt of a request from a station authorized to change the shared plan data file, for editing said shared plan data file;

wherein the shared plan data file can be updated in real time based on input from said authorized member of the shared plan group;

wherein said authorized member is identified in said first database as the member authorized to change data in the shared database.

15. The apparatus of claim 14 wherein said telecommunications network comprises:

a mobile network; and wherein at least one member of said shared plan group is a mobile station.

16. The apparatus of claim 15 wherein said communication session comprises a telecommunications call from or to said at least one member.

17. The apparatus of claim 14 wherein the determining means comprises means for accessing an application server for accessing data to make the determination.

18. The apparatus of claim 14 further comprising:

if the communication session is not authorized, means for permitting the requesting or requested terminal to send an immediate appeal indication to said member of the shared communication plan group authorized to change data to request an exception from a restriction on the communication session; and means, responsive to receipt of an authorization from said member authorized to change data, for establishing said communication session, allowing said call to be completed.

19. The apparatus of claim 14 further comprising:

means for collecting data for communication sessions to and from said shared plan group; and means for reporting said data to the member of the shared plan communication group authorized to change data.

20. The apparatus of claim 14 wherein said member of the shared communication plan group authorized to change data is identified by a personal identification number.

* * * * *